Figure 1:
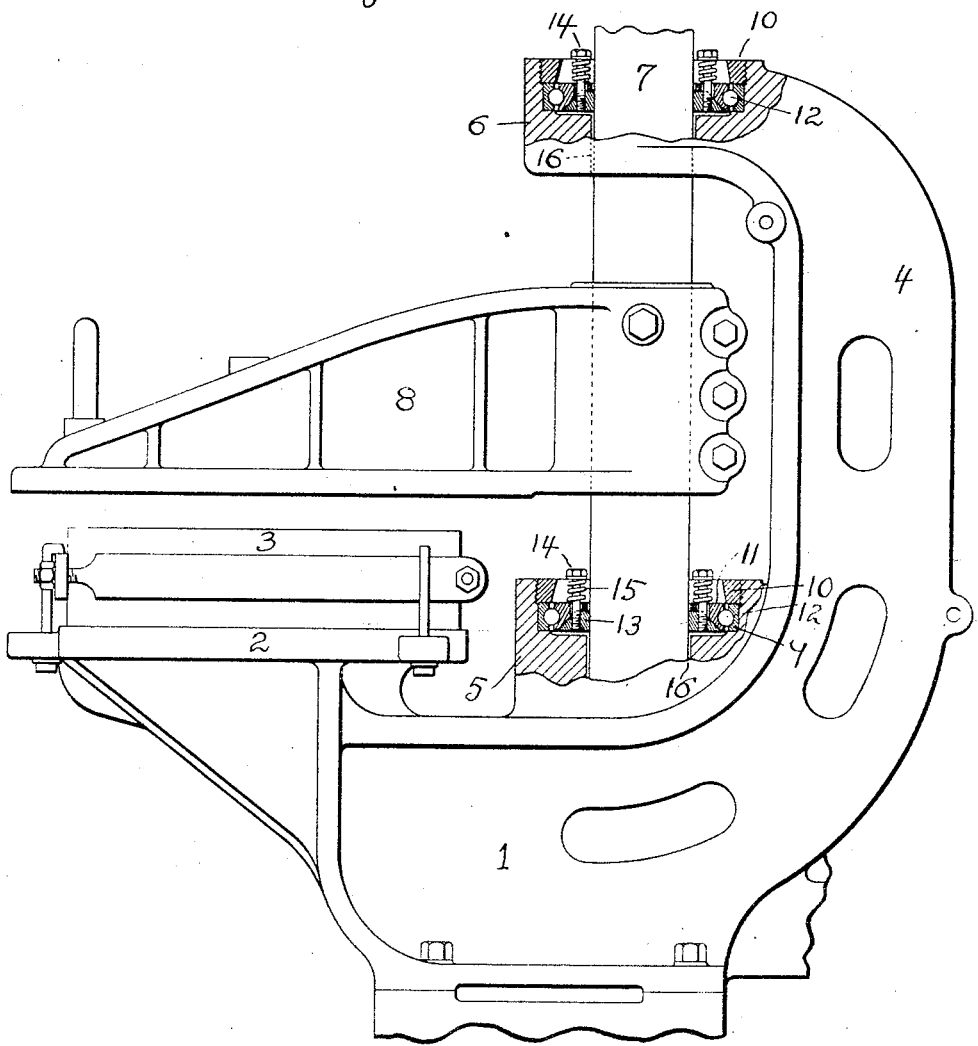

July 4, 1933. J. R. OLIVER 1,916,280
PRESS
Filed Aug. 21, 1930 2 Sheets-Sheet 2

Inventor:
John Roger Oliver
by
Morrison, Kennedy & Campbell,
Attorneys.

Patented July 4, 1933

1,916,280

UNITED STATES PATENT OFFICE

JOHN ROGER OLIVER, OF MEDFIELD, MASSACHUSETTS, ASSIGNOR TO REECE SHOE MACHINERY COMPANY, OF BOSTON, MASSACHUSETTS, A CORPORATION OF MAINE

PRESS

Application filed August 21, 1930. Serial No. 476,873.

This invention is a novel press or analogous machine wherein various kinds of materials are to be compressed, stamped, died-out or otherwise treated between the press members of the machine, and usually operated by power.

The invention is particularly adaptable for use in any press or similar machine wherein is a slide member, post or shaft, carrying or operating one of the press members, and the press member being normally subject to swinging or rotation, with or relatively to the post, but occasionally is subject to relative tilt or thrust. An illustrative embodiment of the invention, as shown in the drawings consists of the so-called clicking machine or press wherein the materials to be died-out or operated on rest upon the lower press member or bed, while the upper press member is arranged not only to move toward and from the bed, but to swing laterally, being supported by an upright shaft, slide or post arranged to slide longitudinally or reciprocate in the frame to afford the operative movements of the press. In a machine of this or analogous sort the swinging presser should be mounted through the use of antifriction bearings, having rolling or ball elements, for easy swinging into and from pressing position. Also an extensive lateral tilt, pressure or thrust occurs, putting a strain on such bearings, namely when the shaft is moved longitudinally by power to give the pressing stroke of the presser, this being due not merely to the reaction upon the presser, and shaft when the presser strikes the goods, but also to a substantial reaction occurring by reason of the inertia of the presser operating to apply a counter force when the shaft commences or terminates its operative stroke.

The main object of the present invention is to afford a construction or mounting of the parts, such as referred to, wherein an antifriction bearing permits free and easy swinging movements of the presser, upon or with the post, but wherein under conditions of excessive strain or thrust in a lateral or tilting manner the antifriction bearing is automatically relieved of the excessive strain and such strain is taken otherwise. A particular object is to secure these results by means of a form of bearing having the easy rotation of a ball bearing, and yet the strength and lateral resistance to displacement of a friction bearing; namely by a bearing combining both such bearings and giving the advantages of both and avoiding the objections of both.

The further and detail objects and advantages of the invention will be explained in the hereinafter following description of certain embodiments thereof or will be understood to those conversant with the subject. To the attainment of such objects and advantages the present invention consists in the herein described and illustrated press and its features of combination, arrangement, construction and detail.

In the accompanying drawings Figure 1 is what may be considered a right elevation of part of a press or clicking machine embodying the principles of the present invention, certain parts being shown in central section to illustrate the interior construction.

Figure 2:
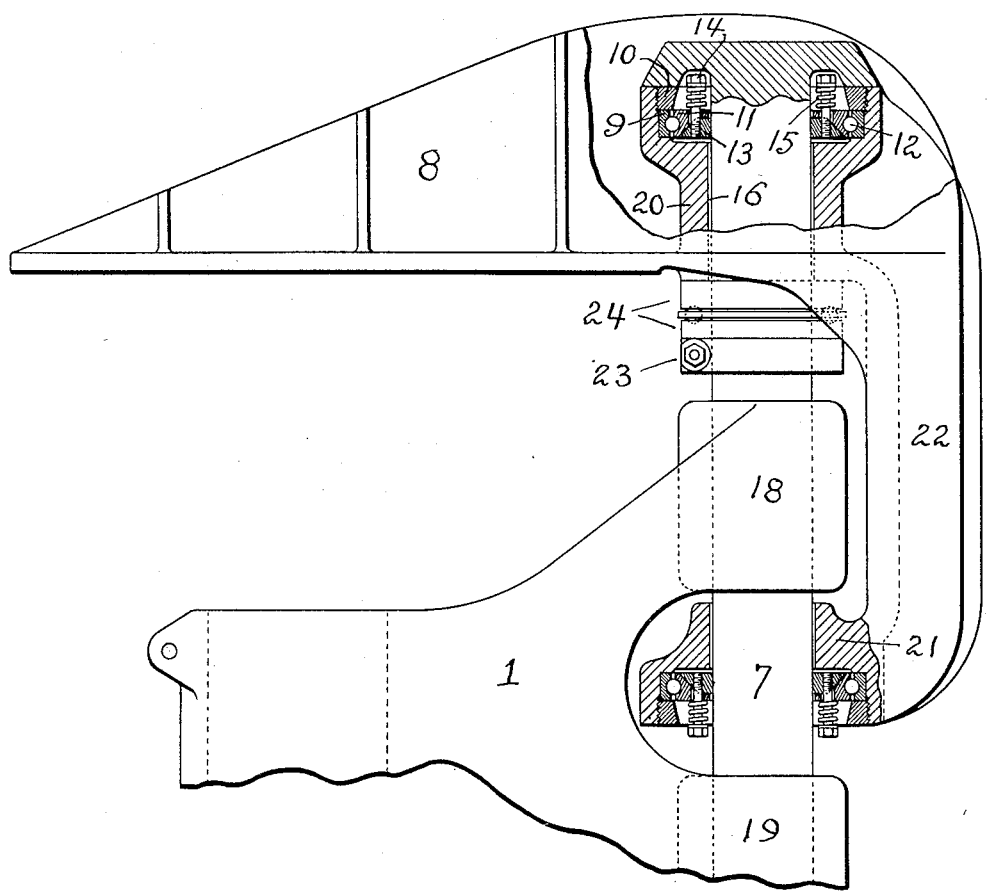

Fig. 2 is a similar view of part of a clicking press of a different type with the invention embodied therein, the press member being swingable relatively to the reciprocating post or shaft, rather than with it.

Referring first to Figure 1 the general frame 1 of the machine is shown as supporting a bed at the front comprising a horizontal supporting frame part 2 upon which rests a cutting block 3, which may be composed of wood as is customary in clicking presses. At the rear the frame is shown as formed with an upright extension 4. Above the main frame is shown what may be termed a lower frame bearing 5, while at the top of the extension 4 is shown a second or upper frame bearing 6, these frame bearings being normally inoperative but coming into action under conditions of excessive pressure, thrust or swing.

The operating shaft, rod or post 7 is shown as slidable vertically through the frame bearings 5 and 6. The lower end of the shaft will be understood to extend through to the base of the machine where it is operatively connected to power mechanism for sliding it longitudinally to give the cutting action of the machine. For example the shaft may be operated by fly wheel and clutch mechanism, through a crank and pitman, arranged on each actuation to give a designated downward movement of the shaft, followed by a return upward movement, the parts there coming to rest; the construction of all of which is well understood and illustrated in various prior patents.

Above the bed or cutting block 3 is shown the upper press member 8 having its lower or striking face arranged preferably parallel to the cutting block. As a specific instance the reciprocating shaft or post 7 may be about 7 inches in diameter, while the presser member 8 may be of a length of 24 inches from the center of the shaft to the free extremity of the member, and of a width of 28 inches; the bed having appropriate corresponding dimensions.

By the described arrangement the pressing and return movements of the upper press member are effected through the reciprocation of the shaft. The swinging movements of the press member are permitted by an antifriction or ball bearing, or plurality of such bearings, arranged either between the press member and the shaft or between the shaft and the frame. In the type of machine shown in Fig. 1 the press member is secured fast to the shaft as indicated by the clamping bolts at the rear end thereof.

In this embodiment the bearing arrangements may be as follows. An antifriction bearing is shown arranged between the frame and the shaft and this may be any type of antifriction bearing, preferably with rolling elements, and is preferably a ball bearing of the annular type. The illustrated construction shows an outer bearing race 9 fixed in the frame bearing 5 and confined by a threaded ring 10. Between the outer race and inner race 11 are the rolling elements or balls 12. These described parts are normally concentric with the shaft, but a relative yielding takes place at certain times as will be described, and to cooperate in this action the inner race 11 is shown as having one of its inner edges beveled for example at 45°. The inner race also has an extension reaching almost, but not quite to the shaft 7, and this extension has longitudinal apertures to receive bolts to be described.

The relative yielding when the shaft or post 7 is put under extensive lateral pressure or thrust may consist of an actual displacement of the shaft in one radial direction from its concentric position shown in Fig. 1. According to this invention when such displacement takes place a yielding action occurs whereby the antifriction bearing is relieved of the excessive pressure, which pressure is taken otherwise. The actual point of yielding might be either between the antifriction bearing and the frame parts surrounding it, or between the antifriction bearing and the shaft, and for purposes of illustration the latter arrangement is shown.

For purposes of such yielding action there is shown, surrounding the shaft 7 a beveled ring member 13, its outer beveled edge corresponding with and engaging the inner beveled edge of the race 11. Extending through the perforations in the extension of the inner race 11 are shown a series of bolts 14, of which there may be a half dozen more or less, these being threaded firmly into the beveled ring 13 and extending loosely through the apertures of the inner race 11. Fairly strong springs 15 are mounted between the heads of the bolts and the race 11, the effect of these springs being to draw relatively upward the beveled ring 13, thus tending to centralize it with respect to the race 11. The beveled ring 13 has a snug sliding fit upon the shaft 7, so that the shaft can slide through it. In one aspect the race 11 and the ring 13 together constitute the inner member of the ball bearing, these being fitted to each other with a beveled sliding fit, but normally held by the springs in the concentric relation as shown.

This arrangement, under excessive thrust or pressure, permits relative displacement or swing of the shaft, at either or both of the bearings, namely by the yielding of the springs 15 and the longitudinal or downward displacement of the ring 13 as it is cammed longitudinally through the action of the cooperating beveled surfaces. To permit such swing, to a slight extent, and yet to take up the movement with a strong rigid resistance, the frame bearings 5 and 6 respectively are shown in such relation to the concentric shaft, that a small clearance 16 is normally allowed, surrounding the shaft, and between it and the frame bearing. This clearance is shown much exaggerated for purposes of illustration and may in fact be so small as to be almost imperceptible, for example it may be .005 inch. This is sufficient to prevent any frictional resistance between the shaft and frame bearings during the free swinging movements of the upper press member, yet as soon as the operating movements of the press take place, and the beveled elements 11 and 13 move relatively under excessive strain, the clearance 16 will be promptly taken up, thus relieving the ball bearing of the strain, which is assumed by the solid rigid frame bearing 5 or 6.

The shaft or post member may thus slide longitudinally, carrying the presser, and may, in this form, tilt bodily with the presser to a minute degree, and rotate with the presser.

The invention as thus described may be summed up as comprising in combination with the frame and the shaft through which the pressing operation is effected of an antifriction bearing at a convenient point between the press member and frame, in this case between the shaft and frame, permitting free rotation of the press member; together with a yieldable member, such as the beveled ring 13, with its holding springs, normally strongly holding the parts in concentric relation, but permitting relative displacement of the shaft upon excessive strain; and with the parts surrounding the antifriction bearing, in this case the frame bearing 5, arranged with a very small clearance between it and the shaft, which clearance may be taken up upon slight displacement due to excessive strain, thus relieving the antifriction bearing of such strain.

In the press shown in Fig. 2 the bed and cutting block are omitted and the frame is of a type having upper and lower frame bearings 18 and 19, neither of which is above the presser as is the bearing 6 in Fig. 1. The frame bearings 18 and 19 are spaced apart to receive between them a connected portion of the presser.

The presser 8 in this figure is shown of a different design, but may have the same relation to the press bed. The press member may have an upper hub 20 surrounding the reciprocating shaft 7 and a lower hub 21 also surrounding the shaft, the latter located between the frame bearings 18 and 19. The presser hubs 20 and 21 are rigidly connected by an extension 22 and these together with the presser itself may be cast in a single integral piece of metal. The weight of the presser may be taken by a collar 23 shown clamped upon the shaft 7, with a thrust bearing 24 between the collar and the under side of the press member.

The special arrangement of antifriction bearing and yielding means is indicated as of similar structure to Fig. 1, although in Fig. 2 these are interposed between the upper and lower hubs 20 and 21 respectively of the press member and the reciprocating shaft, rather than between the shaft and the frame bearings. In this form of clicking machine, the press member swings relatively to the shaft, so that the shaft has only its down and up movements, while the press member partakes of these movements and is additionally swingable as stated. In this form the clearance 16 allows the ball bearing to function during the swinging of the press member, while during the pressing operation the springs 15 may yield to permit the presser to tilt relatively to the shaft, thus relieving the ball bearings of the strain, which is taken up between the shaft and the two hubs, due to the small size of the clearance 16.

As in the Fig. 1 form, the Fig. 2 form embodies the frame, the post and the presser, and in combination with these three elements, the antifriction bearing placed between the post and one of the other elements surrounding it, such surrounding element, the frame parts or the presser, having a small clearance from the post, and centering means yieldingly holding the post, the surrounding element and the bearing in concentric relation, but permitting relative tilting under excessive strain whereby such clearance is taken up and the bearing is relieved of such strain. In each case the yielding centering means is shown as an annular wedge or cam piece adjacent to the bearing and having springs pulling it longitudinally to cam the elements into concentric relation.

In a broad aspect the invention is available for use in other than annular antifriction bearings, for example in thrust bearings, wherein the bearing may function normally, but under excessive pressure may be supplemented by frictional contact upon an abutment, which normally is cleared, but as to which the clearance is taken up under the stress of the heavy pressure. The invention therefore may be broadly described as comprising the combination with any support or frame and any rotary part or shaft, of an antifriction bearing consisting of its two races with the rolling elements between, one of the races mounted on the rotary part and the other race mounted on the support, and one of the races, preferably that on the support, being yieldably mounted, together with resilient means or springs normally preventing such yield and permitting the bearing to function as such, but permitting such yield upon heavy pressure, and an abutment on the support having normal clearance from the rotary part, but adapted to be contacted by the rotary part when the resilient means yields under heavy pressure, whereby the abutment takes the load of the excess pressure and so relieves the antifriction bearing of undue strain.

There has thus been described a press or clicking machine embodying the principles and attaining the objects of the present invention. Since many matters of combination, arrangement, construction and detail may be variously modified without departing from the principles, it is not intended to limit the invention to such matters except to the extent set forth in the appended claims.

What is claimed is:

1. In a press or analogous machine having a central or post member and a member surrounding it with small clearance, one of which members is subject to rotation relatively to the other, and one of which members is subject to repeated abnormally heavy tilting or lateral displacing stresses; the combination with said members of an antifriction bearing between them normally permitting free rotation, and a mechanical centering means normally holding said members and bearing in concentric relation, but having a resilient element or spring permitting relative tilting or lateral displacement to eccentric position under abnormal stresses, whereby the small clearance between post and surrounding member is taken up and the antifriction bearing thus relieved of such abnormal stresses.

2. In a press or analogous machine having a central or post member and a member surrounding it with small clearance, one of which members is subject to rotation relatively to the other, and one of which members is subject to repeated abnormally heavy tilting or lateral displacing stresses; the combination with said members of an antifriction bearing between them normally permitting free rotation, and a mechanical centering means normally holding said members and bearing in concentric relation, consisting of an annular wedge or cam ring adjacent and cooperating with the bearing, with spring means pressing such ring longitudinally relatively to the bearing to cam the members into concentric relation, the spring means permitting relative displacement to eccentric relation to take up under abnormal stresses the small clearance between post and surrounding member.

3. In a press or analogous machine having a central or post member and a member surrounding it with small clearance, one of which members is subject to rotation relatively to the other, and one of which members is subject to repeated abnormally heavy tilting or lateral displacing stresses; the combination with said members of an antifriction bearing between them normally permitting free rotation, and a mechanical centering means normally holding said members and bearing in concentric relation, consisting of a cam device interposed between the bearing and one of the members, with spring means pressing the cam device to cam the members into concentric relation.

4. In a press or analogous machine having a central or post member and a member surrounding it with small clearance, one of which members is subject to rotation relatively to the other, and one of which members is subject to repeated abnormally heavy tilting or lateral displacing stresses; the combination with said members of an antifriction bearing between them normally permitting free rotation, and a mechanical centering means normally holding said members and bearing in concentric relation, consisting of a wedge means between the post and bearing with spring means acting thereon normally to hold yieldingly the post and surrounding members in concentric relation.

5. In a press or analogous machine having a central or post member and two longitudinally spaced members surrounding it with small clearance, the central member or each surrounding member being subject to rotation relatively to the other, and one of which is subject to repeated abnormally heavy stresses tending to tilt it relatively to the other; the combination with said members of two annular antifriction bearings between them spaced longitudinally apart and normally permitting free rotation, and for each such bearing a mechanical centering means normally holding said members and bearing in concentric relation but comprising a resilient element or spring permitting relative tilting under abnormal stresses whereby the small clearance between the post and surrounding member is taken up and the antifriction bearing relieved of such abnormal stresses.

6. The combination as in claim 5 and wherein the central member is a rotatable post while the surrounding members are stationary with the frame of the machine.

7. The combination as in claim 5 and wherein the central member is non-rotatable but longitudinally slidable and the surrounding members are hubs interconnected and rotatable in unison about the central member while subject to heavy tilting stresses.

In testimony whereof, this specification has been duly signed by:

JOHN ROGER OLIVER.